US012785124B2

(12) United States Patent
De-Sorbier et al.

(10) Patent No.: US 12,785,124 B2
(45) Date of Patent: Nov. 3, 2026

(54) METHOD OF OPERATING A FUEL CELL SYSTEM WITH CARBON DIOXIDE RECOVERY AND ASSOCIATED INSTALLATION

(71) Applicant: TECHNIP ENERGIES FRANCE, Nanterre Cedex (FR)

(72) Inventors: Thibault De-Sorbier, Nanterre Cedex (FR); Marc Sellini, Nanterre Cedex (FR); Gaël Leymarios, Nanterre Cedex (FR)

(73) Assignee: TECHNIP ENERGIES FRANCE, Nanterre Cedex (FR)

( * ) Notice: Subject to any disclaimer, the term of this patent is extended or adjusted under 35 U.S.C. 154(b) by 1136 days.

(21) Appl. No.: 17/872,346

(22) Filed: Jul. 25, 2022

(65) Prior Publication Data

US 2023/0022303 A1 Jan. 26, 2023

(30) Foreign Application Priority Data

Jul. 23, 2021 (FR) ....................................... 2108009

(51) Int. Cl.

*H01M 8/0612* (2016.01)
*H01M 8/04014* (2016.01)
*H01M 8/04119* (2016.01)
*H01M 8/0637* (2016.01)

(52) U.S. Cl.

CPC ..... *H01M 8/0618* (2013.01); *H01M 8/04014* (2013.01); *H01M 8/04164* (2013.01); *H01M 8/0637* (2013.01)

(58) Field of Classification Search

None
See application file for complete search history.

(56) References Cited

U.S. PATENT DOCUMENTS 6,432,565 B1 * 8/2002 Haines .............. H01M 8/04089 429/434
10,173,178 B1 * 1/2019 Deshpande .......... B01D 71/381
2002/0110503 A1 * 8/2002 Gittleman ................. C01B 3/56 423/247

(Continued)

FOREIGN PATENT DOCUMENTS

| | | | | |
|---|---|---|---|---|
| DE | 102012218648 | A1 | | 4/2014 |
| JP | 2006139984 | A | * | 6/2006 |
| JP | 2016225088 | A | * | 12/2016 |

OTHER PUBLICATIONS

JP-2016225088-A—machine translation (Year: 2016).*

(Continued)

*Primary Examiner* — Haroon S. Sheikh

(74) *Attorney, Agent, or Firm* — Troutman Pepper Locke LLP; Gabrielle L. Gelozin

(57) ABSTRACT

A method of operating a fuel cell system includes the operating a fuel cell unit, the recovery at the outlet of the fuel cell unit of a carbon dioxide-rich anodic gas flow, the cooling of the anodic gas flow and the condensation of the water present in the anodic gas flow in order to form a dry anodic flow, the introduction of the dry anodic flow into a carbon dioxide capture unit in order to form a carbon dioxide gas flow and a carbon dioxide-depleted anodic flow, the recycling of at least portion of the carbon dioxide-depleted anodic flow into the fuel feed flow.

20 Claims, 2 Drawing Sheets

(56) References Cited

U.S. PATENT DOCUMENTS

| | | | | |
|---|---|---|---|---|
| 2005/0123810 | A1* | 6/2005 | Balan | H01M 8/0612 429/432 |
| 2005/0271914 | A1* | 12/2005 | Farooque | H01M 8/0668 429/410 |
| 2006/0115691 | A1* | 6/2006 | Hilmen | F02C 6/10 429/495 |
| 2007/0178338 | A1* | 8/2007 | McElroy | B01D 53/228 429/492 |
| 2012/0178003 | A1* | 7/2012 | Venkataraman | H01M 8/04007 429/408 |
| 2013/0108936 | A1* | 5/2013 | McElroy | H01M 8/04097 429/410 |
| 2015/0093664 | A1 | 4/2015 | Berlowitz et al. | |
| 2015/0321136 | A1* | 11/2015 | Seiki | B01D 53/1475 96/242 |
| 2016/0144295 | A1* | 5/2016 | Zhou | B01D 53/1475 95/259 |
| 2016/0359182 | A1* | 12/2016 | Farooque | H01M 8/0612 |
| 2017/0136400 | A1* | 5/2017 | Sundaram | B01D 53/0423 |
| 2021/0020974 | A1* | 1/2021 | Ballantine | B01D 53/62 |
| 2022/0216489 | A1* | 7/2022 | Perry | H01M 8/04029 |
| 2022/0246966 | A1* | 8/2022 | Brown | C25B 1/04 |
| 2023/0064109 | A1* | 3/2023 | Lourenco | H01M 8/0668 |
| 2023/0197994 | A1* | 6/2023 | O'Neal | H01M 8/145 429/425 |

OTHER PUBLICATIONS

JP-2006139984-A—machine translation (Year: 2006).*

Search Report issued during prosecution of corresponding French Patent Application No. FR2108009 dated Apr. 29, 2022. (2 pages).

Campanari S.: "Carbon dioxide separation from high temperature fuel cell power plants", Journal of Power Sources, Elsevier, Amsterdam, NL, vol. 112, No. 1, Oct. 24, 2002, pp. 273-289, XP004387657, ISSN: 0378-7753, DOI: 10.1016/S0378-7753(02) 00395-6.

* cited by examiner

METHOD OF OPERATING A FUEL CELL SYSTEM WITH CARBON DIOXIDE RECOVERY AND ASSOCIATED INSTALLATION

CROSS-REFERENCE TO RELATED APPLICATIONS

This application claims priority to and the benefit of French Patent Application No. FR 21 08009, filed Jul. 23, 2021, the entire contents of which are herein incorporated by reference in their entirety.

FIELD

The present invention relates to a method for operating a fuel cell system comprising a step of carbon dioxide recovery.

The method of the invention is typically implemented in a fuel cell installation allowing an electric current to be produced by electrochemical reaction between a liquid fuel and the oxygen in the air. The liquid fuel is typically a gas such as hydrogen, carbon monoxide, methane, propane, butane, fermentation gases, gasified biomass, and/or paint vapors. The liquid fuel may also consist of a liquid fuel such as methanol, ethanol or fuel, in particular such as diesel or gasoline.

The fuel cell typically consists of one or more solid oxide fuel cells (SOFC).

Such cells are mainly intended for stationary applications with an output power ranging from 1 KW to 2 MW.

BACKGROUND

A SOFC element generally consists of four layers, three of which are ceramics. A single cell consisting of the four superposed layers has a typical thickness of a few millimeters. Tens of such cells are then superimposed in series to form a stack.

In such cells, oxygen ions which are formed on the cathode side, are moved through a solid oxide membrane used as an electrolyte at high temperature, in order to react with the gaseous fuel, e.g. hydrogen, on the anode side.

Such electrochemical reaction leads to the production of electricity as well as the formation of carbon dioxide and water, resulting from the electrochemical reaction.

Carbon dioxide $CO_2$ is, however, one of the main greenhouse gases, the release of which into the atmosphere are responsible for global warming. In order to reduce the environmental impact of fuel cells, it is therefore necessary to minimize the release of carbon dioxide into the atmosphere.

Moreover, although the electrochemical reaction between oxygen ions and the fuel is complete, the amount of oxygen ions generated in the SOFC element is insufficient for consuming the entire (re-formed) liquid fuel. A large quantity of non-consumed liquid fuel is thus necessarily recovered at the outlet of the SOFC element. The conversion rate of the liquid fuel in a SOFC element is conventionally on the order of 60%.

In the known installations, a portion of the gas leaving the anode, comprising the carbon dioxide formed, is recycled toward the anode of the cell in order to consume the portion of fuel which did not react, thus increasing the efficiency of the cell. The remaining portion of the flow leaving the anode is sent into a catalytic burner wherein same is burned with the oxygen-depleted air flow recovered at the outlet of the cathode of the SOFC element.

In order to recover the carbon dioxide present in industrial effluents, it is known how to inject same into a carbon dioxide capture unit. Carbon dioxide capture is typically carried out using a liquid solvent, in particular an amine aqueous solution, apt to absorb carbon dioxide. The liquid solvent absorbs the carbon dioxide present in gaseous effluents. A simple heating of the carbon dioxide-laden liquid solvent is then used for recovering the carbon dioxide and for regenerating the liquid solvent which can thus be used again for the treatment of new effluents.

In such a configuration, close to a conventional smoke extraction system, the carbon dioxide capture unit is placed after the catalytic burner so as to treat the flow coming out of the burner. Same thus forms a post-treatment module for effluents, before the discharge thereof from the installation. The carbon dioxide capture unit is not integrated into the fuel cell installation. In particular, herein, the output flow from the carbon dioxide capture unit is not reinjected into the installation.

Furthermore, the concentration of carbon dioxide in the gas coming out from the catalytic burner is very low, typically less than or equal to 8% molar. Indeed, the portion of the anodic flow introduced into the catalytic burner is mixed with oxygen-depleted air coming out of the cathode. Such mixing step then has the effect of significantly reducing the concentration of carbon dioxide in the effluents to be treated. The recovery of carbon dioxide present in such a low concentration requires the use of a liquid solvent with a very high regeneration rate, typically the use of a perfectly regenerated liquid solvent, which means a very high energy consumption. Moreover, the oxygen in the air present after the burner can lead to problems of degradation of the liquid solvent, especially the amine compound.

Such installations further require expensive and bulky equipment such as a stripping column, along with reboiling and condensation systems. More precisely, a reboiling system is used for heating the carbon dioxide-laden liquid solvent to temperatures typically close to 130° C. allowing a large flow of water vapor to be vaporized. The water vapor regenerates the liquid solvent by rising in back-flow inside the stripping column. At the top of the stripping column, all of the carbon dioxide coming from the loaded liquid solvent is recovered with a significant proportion of water vapor. The carbon dioxide is recovered via a condensation step used to extract the water in liquid form. The liquid water is then reinjected at the top of the stripping column, same will descend along the column all way down to the reboiling system in order to be partially vaporized again. The vaporization/condensation system thus involves a high energy consumption in the reboiling system.

SUMMARY OF THE INVENTION

A goal of the invention is thus to provide a method for operating a fuel cell system for efficiently and reliably recovering the carbon dioxide present in the anode effluents, while limiting the investment and operating costs of the method.

In particular, the goal of the invention is to provide an integrated method which significantly minimizes the energy requirement for the recovery of carbon dioxide.

More particularly, the goal of the invention is to provide a method for operating a fuel cell system incorporating a carbon dioxide capture unit, the operation of which does not require a supply of external energy, the thermal energy necessary for the operation thereof being recovered by heat integration.

To this end, the subject matter of the invention is a method for operating a fuel cell system, comprising the following steps:

- the operation of a fuel cell unit comprising at least one anode system and at least one cathode system, said fuel cell unit being continuously supplied with a fuel feed flow injected at the anode system and with an oxygen-rich gas flow injected at the cathode system;
- the recovery at an outlet the fuel cell unit of an anodic gas flow rich in carbon dioxide and a cathodic gas flow comprising water;
- the cooling of the anodic gas flow and the condensation of the water present in the anodic gas flow in a post-treatment, cooling and condensation unit so as to form a dry anodic flow;
- the introduction of the dry anodic flow into a carbon dioxide capture unit so as to form a carbon dioxide gas flow and a carbon dioxide-depleted anodic flow;
- the injection of at least portion of the carbon dioxide-depleted anodic flow into the fuel feed flow so as to recycle the at least portion inside the fuel cell unit.

The method according to the invention can comprise one or a plurality of the following features, taken alone or in any technically possible combination:

- the anodic flow depleted in carbon dioxide has a concentration of carbon dioxide between 10% to 80% by volume, preferentially from 20% to 70% by volume, even more preferentially from 40% to 60% by volume;
- at the carbon dioxide capture unit, the dry anodic flow is brought into contact with a liquid solvent apt to absorb carbon dioxide in order to form the carbon dioxide-depleted anodic flow and a liquid bottom flow comprising the carbon dioxide-laden liquid solvent;
- the carbon dioxide absorbed in the liquid bottom flow is then partially released by heating the liquid bottom flow in order to form the carbon dioxide flow and a partially regenerated liquid solvent flow;
- the liquid bottom flow is heated by heat exchange with the anodic gas flow and/or the cathodic gas flow, preferentially is heated only by heat exchange with the anodic gas flow and/or the cathodic gas flow;
- at least 80% of the carbon dioxide produced during the execution of the method is recovered in the carbon dioxide gas flow, preferentially at least 90% molar, more preferentially from 90% to 99% molar.
- the feed flow of liquid fuel is a C1-C5 hydrocarbons flow, preferentially a flow of methane;
- a portion of the carbon dioxide-depleted anodic flow is taken from the carbon dioxide capture unit and then burned in a furnace, preferentially less than 30% by weight of the carbon dioxide-depleted anodic flow is introduced into the furnace (120), more preferentially from 5 to 20% by weight;
- the liquid bottom flow is at least partially heated by heat exchange with a heat-transfer fluid flowing through a closed heat exchange circuit, said heat-transfer fluid being heated by heat exchange with the anodic gas flow and/or the cathodic gas flow;
- before being injected into the fuel cell unit, the feed flow of liquid fuel is heated by heat exchange with the anodic gas flow.

The invention further relates to a fuel cell installation comprising:

- a fuel cell unit which includes an inlet for introducing a feed flow of fuel, an inlet for introducing an oxygen-rich gas flow, an outlet for recovering an anodic gas flow, and an outlet for recovering a cathodic gas flow,
- a post-treatment, cooling and condensation unit for cooling and drying the anodic gas flow in order to form a dry anodic flow,
- a carbon dioxide capture unit intended for forming a carbon dioxide gas flow and a carbon dioxide-depleted anodic flow comprising an inlet for introducing the dry anodic flow and an outlet for recovering the carbon dioxide-depleted anodic flow,
- wherein the recovery outlet of the carbon dioxide-depleted anodic flow is connected to the inlet for introducing the fuel feed flow into the fuel cell unit.

The installation according to the invention may comprise one or a plurality of the following features, taken alone or in any technically possible combination:

- the carbon dioxide capture unit comprises:
  - an absorber intended to bring the dry anodic flow into contact with a liquid solvent apt to absorb carbon dioxide in order to form the anodic flow depleted in carbon dioxide at the top of the absorber and at the bottom of the absorber a liquid bottom flow comprising the carbon dioxide-laden liquid solvent,
  - at least one heat exchanger system for heating the liquid bottom flow in order to form a heated bottom flow,
  - a tank connected to the at least one heat exchanger system intended for forming the carbon dioxide flow at the top of the tank and, at the bottom of the tank, a flow of partially regenerated liquid solvent intended for being injected into the absorber;
- the installation further comprises a closed heat exchange circuit comprising a heat-transfer fluid intended for being placed under heat exchange with a liquid bottom flow comprising the carbon dioxide-laden liquid solvent, at said at least one heat exchanger system, and with the anodic gas flow and/or the cathodic gas flow;
- the carbon dioxide capture unit does not have a stripping column.

BRIEF DESCRIPTION OF THE DRAWINGS

The invention will be better described upon reading the description which follows, given solely as an example, and made with reference to the enclosed drawings, wherein.

DETAILED DESCRIPTION

Figure 1:
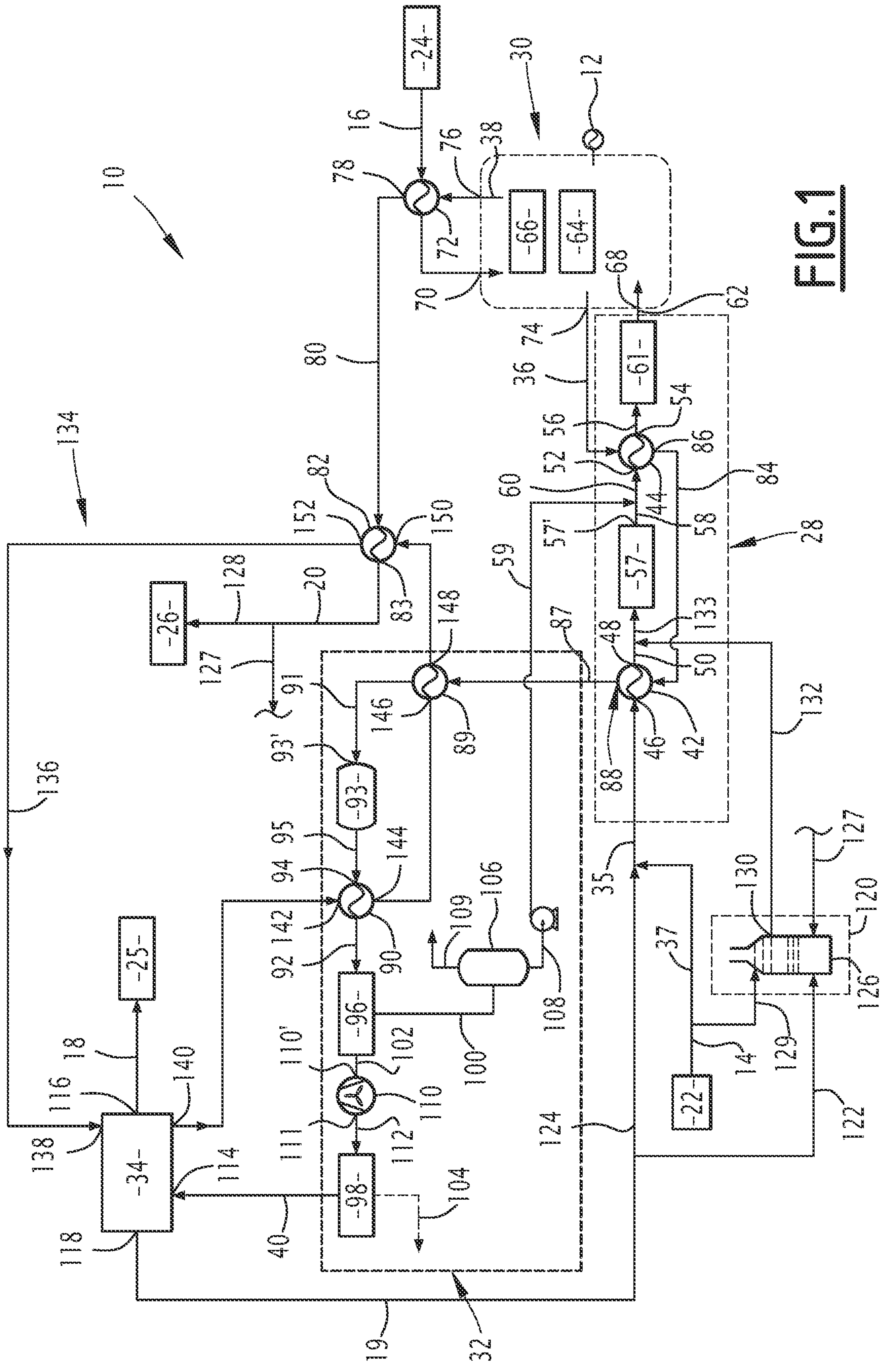
FIG. 1 is an engineering diagram of an installation intended for implementing a method according to the invention.

An installation 10 according to the invention is shown schematically in FIG. 1.

The installation 10 is intended for the production of an electric current 12 from a fuel gas flow 14 and an oxygen-rich gas flow 16.

The installation 10 is also intended for the recovery, as effluents, of a flow of carbon dioxide 18 and of an oxygen-depleted gaseous flow 20.

The installation is connected upstream to a first storage unit 22 intended for storing the fuel gas 14, and to a second storage unit 24 intended for storing the oxygen-rich gas 16.

Alternatively, the storage unit 22 can be replaced by a gas distribution network for conveying the fuel gas into the installation 10 according to the invention.

When the oxygen-rich gas 16 is air, the storage unit 24 can be replaced by a pump and compressor system for conveying atmospheric air, compressed if appropriate, into the installation 10 according to the invention.

The fuel gas flow 14 typically comprises hydrogen; carbon monoxide; natural gas containing mainly methane along with lower amounts of ethane, propane, butane and heavier hydrocarbons; fermentation gases; gasified biomass; paint vapors or any of the mixtures thereof. Preferentially, the fuel gas flow 14 is a methane flow.

Preferentially, the fuel gas flow 14 is at a pressure ranging from 1 atm to 5 bara (absolute bars), more preferentially from 1 atm to 1.5 bara (absolute bars).

The oxygen-rich gas flow 16 typically has a concentration of oxygen of at least 10% by volume, preferentially from 15% to 25% by volume of oxygen. Advantageously, the oxygen-rich gas flow 16 is an air flow.

Preferentially, the oxygen-rich gas flow 16 is at a pressure ranging from 1 atm to 5 bara (absolute bars).

The installation 10 is connected downstream to an installation 25 for transporting and/or sequestering carbon dioxide and to an installation 26 for collecting the oxygen-depleted gas flow 20 for post-treatment or for discharging the oxygen-depleted gas flow 20 directly into the atmosphere.

Preferentially, the oxygen-depleted gas flow 20 is discharged directly into the atmosphere at the installation 26.

Alternatively, the oxygen-depleted gas flow 20 is collected in the installation 26 in order to be conveyed to another installation where same will be consumed or converted.

The installation 10 typically comprises a pretreatment unit 28, a fuel cell unit 30, a post-treatment, cooling and condensation unit 32, and a carbon dioxide capture unit 34.

The storage unit 22 (or the gas distribution network) is connected to the inlet of the pretreatment unit 28 so that a first portion 37 of the fuel gas flow 14 is injected into the pretreatment unit 28.

Before the introduction thereof into the pretreatment unit 28, the first portion 37 of the fuel gas flow 14 is mixed with a recycling flow 124 recovered at the outlet of the carbon dioxide capture unit 34 in order to form a fuel feed flow 35. The nature of the recycling flow 124 is described in detail hereinafter.

The pretreatment unit 28 is intended for heating and pretreating the fuel feed flow 35 before same is introduced into the fuel cell unit 30.

The fuel cell unit 30 is intended for producing the electric current 12 from the fuel feed flow 35 and the oxygen-rich gas flow 16 in order to form an anodic gas flow 36 and a cathodic gas flow 38 at the outlet.

The post-treatment, cooling and condensation unit 32 is intended for cooling the anodic gas flow 36 and for extracting by condensation, the excess water therefrom in order to form a dry anodic flow 40. Preferentially, the unit 32 further converts into hydrogen and carbon dioxide at least a portion of the carbon monoxide present in the anodic gas flow 36, typically by reaction with water vapor. The conversion can then be used for limiting the oxidation of the liquid solvent used in the carbon dioxide capture unit 34 by the oxidizing molecules of carbon monoxide and for increasing the concentration of carbon dioxide in the anodic gas flow 36 in order to facilitate the capture thereof in the unit 34.

Finally, the carbon dioxide capture unit 34 is intended for recovering at least a portion of the carbon dioxide present in the dry anodic flow 40 in the form of the carbon dioxide flow 18 and for recovering a carbon dioxide-depleted anodic flow 19.

In a preferred configuration, the pretreatment unit 28 typically includes a first heat exchanger system 42 and a second heat exchanger system 44 intended for heating the fuel feed flow 35, before the introduction thereof into the fuel cell unit 30.

As defined in the invention, a heat exchanger system comprises at least one heat exchanger. A heat exchanger system can thus comprise one heat exchanger or a plurality of heat exchangers associated with each other.

The first heat exchanger system 42 thus comprises an inlet 46 for introducing the fuel feed flow 35 and an outlet 48 for recovering a preheated fuel flow 50. The second heat exchanger system 44 comprises an inlet 52 for introducing the preheated fuel flow 50 and an outlet 54 for recovering a heated fuel flow 56.

Preferentially, the pretreatment unit 28 further comprises, between the first heat exchanger system 42 and the second heat exchanger system 44, a desulfurization unit 57. The desulfurization unit 57 is connected to both the outlet 48 of the first heat exchanger system 42 and to the inlet 52 of the second heat exchanger system 44. The desulfurization unit 57 is intended for absorbing any sulfur present in the fuel feed flow 35, in order to prevent the downstream poisoning of the fuel cell unit 30. Desulfurization units are known to a person skilled in the art and will therefore not be discussed here in further detail. The desulfurization unit 57 then comprises an outlet 57' for recovering a desulfurized fuel flow 58.

Preferentially, the outlet 57' of the desulfurization unit 57 is connected to a water flow 59 so that the desulfurized fuel flow 58 is mixed with the water flow 59 in order to form a mixed flow 60.

Thus, and when the pretreatment unit 28 comprises a desulfurization unit 57, the second heat exchanger system 44 is fed with the mixed flow 60 and not with the preheated fuel flow 50 as indicated above. In particular, in such case the inlet 52 is an inlet for introducing the mixed flow 60 into the second heat exchanger system 44.

The pretreatment unit 28 may further comprise, preferentially downstream of the second heat exchanger system 44, a pre-reforming module 61. The pre-reforming module 61 is typically connected to both the outlet 54 of the second exchanger system 44 and the fuel cell unit 30. The pre-reforming module 61 is intended for forming, from the heated fuel flow 56, a flow 62 consisting of hydrogen, carbon monoxide, water and a portion of the unreacted initial fuel. In particular, the pre-reforming module 61 converts hydrocarbons heavier than methane such as ethane, propane, butane and pentane present in the fuel feed flow 35 in order to prevent carbon deposition (or coking) within the fuel cell unit 30. The pre-reforming modules are known to a person skilled in the art and will therefore not be discussed here in further detail.

The pretreatment unit 28 may also comprise additional modules intended for removing other pollutants or impurities which would be present in the fuel feed flow 35, such as e.g. mercury. Such modules are known to a person skilled in the art who will know how to integrate same into the installation according to the invention without modifying the operation described herein.

The fuel cell unit 30 typically comprises at least one anode system 64 and at least one cathode system 66, separated from one another by at least one electrolyte (not shown), in particular a solid electrolyte.

As defined by the invention, a system of anodes (or cathodes) comprises at least one anode (at least one cathode, respectively). A system of anodes (cathodes, respectively) can thus comprise one anode (cathode respectively) or a plurality of anodes (cathodes respectively) associated with each other.

The fuel cell unit 30 comprises an inlet 68 for introducing the heated fuel flow 56 (or the flow 62 coming from the pre-reforming module 60, when the pre-reforming module 61 is present). The inlet 68 is intended for bringing the heated fuel flow 56 (or the flow 62 coming from the pre-reforming module 61) into contact with the anode system 64.

The fuel cell unit 30 further includes an inlet 70 for introducing the oxygen-rich gas flow 16. In particular, the inlet 70 is intended for bringing the oxygen-rich gas flow 16 into contact with the cathode system 66.

Preferentially, the installation 10 according to the invention, further comprises, upstream of the inlet 70, a third heat exchanger system 72. When the installation 10 comprises a storage unit 24, the third heat exchanger system 72 is typically located between the storage unit 24 and the inlet 70. The third heat exchanger system 72 is intended for heating the oxygen-rich gas flow 16 before same is introduced into the fuel cell unit 30.

The fuel cell unit 30 further includes an outlet 74 for recovering the anodic gas flow 36, coming from the operation of the fuel cell unit 30 and recovered at the anode system 64.

The fuel cell unit 30 further includes an outlet 76 for recovering an oxygen-depleted cathodic gas flow 38, coming from the operation of the fuel cell unit 30 and recovered at the cathode system 66.

The outlet 76 for recovering the cathodic gas flow 38 is connected to the installation 26.

According to one embodiment, the outlet 76 for recovering the cathodic gas flow 38 is connected, upstream of the installation 26, to the third heat exchanger system 72 so that the cathodic gas flow 38 is cooled therein, by heat exchange with the oxygen-rich gas flow 16, in order to form a cooled cathodic flow 80. The third heat exchanger system 72 then comprises an outlet 78 for recovering the cooled cathodic flow 80.

Such embodiment is advantageous in that same can be used to heat the oxygen-rich gas flow 16, before being introduced into the fuel cell unit 30, by heat integration, without requiring external energy input.

According to one embodiment, still upstream of the installation 26, the outlet 78 for recovering the cooled cathodic flow 80 is connected to a fourth heat exchanger system 82 intended for cooling the cooled cathodic flow 80 in order to form the oxygen-depleted gas flow 20. The fourth heat exchanger system 82 thus comprises an outlet 83 for recovering the oxygen-depleted gas flow 20, said outlet 83 being connected to the installation 26.

According to one embodiment, the outlet 74 for recovering the anodic gas flow 36 is connected to the second heat exchanger system 44 so that the anodic gas flow 36 is cooled by heat exchange with the preheated fuel flow 50 (in the absence of a desulfurization unit 57) or with the mixed flow 60 (when the installation comprises a desulfurization unit 57), in order to form an intermediate anodic flow 84. The second heat exchanger system 44 then includes an outlet 86 for recovering the intermediate anodic flow 84.

Preferentially, the outlet 86 for recovering the intermediate anodic flow 84 is connected to the first heat exchanger system 42 so that the intermediate anodic flow 84 is cooled again by heat exchange with the fuel feed flow 35 in order to form a pre-cooled anodic flow 87. The first heat exchanger system 42 includes an outlet 88 for recovering the pre-cooled anodic flow 87. The outlet 88 is connected to the post-treatment, cooling and condensation unit 32.

Such embodiment is advantageous in that same makes it possible both to heat the fuel feed flow 35, before the introduction thereof into the fuel cell unit 30, and to pre-cool the anodic gas flow 36, before the treatment thereof in the carbon dioxide capture unit 32, by heat integration without requiring external energy input.

The post-treatment, cooling and condensation unit 32 typically comprises a fifth heat exchanger system 89 and a sixth heat exchanger system 90 for cooling the pre-cooled anodic flow 87. In particular, the fifth heat exchanger system 89 is intended for cooling the pre-cooled anodic flow 87 in order to form an intermediate flow 91. The sixth heat exchanger system 90 is intended for cooling the intermediate flow 91 in order to form a cooled anodic flow 92.

Preferentially, the post-treatment, cooling and condensation unit 32 further comprises, preferentially between the fifth heat exchanger system 89 and the sixth heat exchanger system 90, a gas/water-reaction unit 93. The gas/water-reaction unit 93 is intended for converting into carbon dioxide $CO_2$ and hydrogen, at least a portion of the carbon monoxide CO present in the pre-cooled anodic flow 87, by reaction with water vapor. The gas/water-reaction units are known to a person skilled in the art and will not be described further hereinafter in the description. The gas/water-reaction unit 93 then comprises an inlet 93' for introducing the intermediate flow 91 and an outlet 94 for recovering a carbon monoxide-depleted flow 95.

Thus, and when the post-treatment, cooling and condensation unit 32 comprises a gas-water reaction unit 93, the sixth heat exchanger system 90 is fed with the carbon monoxide-depleted flow 95 and not with the intermediate fuel flow 91 as indicated above.

The sixth heat exchanger system 90 is also connected, downstream, to a series of condenser systems 96, 98 intended to condense a portion of the water present in the cooled anodic flow 92. The first condenser system 96 is intended for condensing a first portion of the water present in the cooled anodic flow 92 in order to form a first condensate flow 100 and an intermediate gas flow 102. The second condenser system 98, placed after the first condenser system 96, is intended for condensing a second portion of the water present in the intermediate gas flow 102 in order to form a second condensate flow 104 and the dry anodic flow 40.

Preferentially, the first condenser 96 is connected to a liquid water recovery system 106 intended for separating the first flow of mainly aqueous condensates 100 in order to form, at the bottom of the recovery system 106, a mainly aqueous liquid flow 108 and a gas flow of condensates 109 at the top of the tank 106. Advantageously, the recovery system 106 is connected to the outlet 57' of the desulfurization unit 57 so that the flow of liquid water 108 is injected into the desulfurized fuel flow 58, upstream of the second heat exchanger system unit 44. Thus, the flow of liquid water 108 forms the flow of water 59 as defined above.

Preferentially, the post-treatment, cooling and condensation unit 32 further comprises, between the first condenser system 96 and the second condenser system 98, a compression/blower unit 110, e.g. a compressor, intended for pressurizing the intermediate gas flow 102 before same is introduced into the second condenser system 98. The compression/blower unit 110 then comprises an inlet 110' for introducing the intermediate gas flow 102 and an outlet 111 for recovering a compressed anodic flow 112.

Thus, and when the post-treatment, cooling and condensation unit 32 comprises a compression/blower unit 110, the second condenser system 98 is fed with a compressed anodic flow 112 and not with an intermediate gas flow 102 as indicated above.

The carbon dioxide capture unit 34 typically comprises an inlet 114 for introducing the dry anodic flow 40, an outlet 116 for recovering the carbon dioxide flow 18, and an outlet 118 for recovering the carbon dioxide-depleted anodic flow 19.

A preferred structure of the carbon dioxide capture unit 34 is described below with reference to FIG. 2.

Preferentially, the outlet 118 for recovering the carbon dioxide-depleted anodic flow 19 is connected to the inlet of the pretreatment unit 28 so that the carbon dioxide-depleted anodic flow 19 is injected into the fuel feed flow 35.

Thus, the fuel feed flow 35 entering the pretreatment unit 28 consists of a mixture of the first portion 37 of the fuel gas flow 14 and the carbon dioxide-depleted anodic flow 19.

According to one embodiment, the outlet 118 for recovering the carbon dioxide-depleted anodic flow 19 is further connected to a furnace 120 so that portion 122 of the carbon dioxide-depleted anodic flow 19 is injected into a furnace 120. The other portion 124 of the carbon dioxide-depleted anodic flow 19 is then injected into the fuel feed flow 35 as specified above.

The furnace 120 comprises a burner 126 along with a seventh heat exchanger system (not shown).

The use of the furnace 120 makes it possible to purge the inert gases possibly present in the fuel gas flow 14 and thus to prevent the accumulation thereof in the installation 10.

In particular, the outlet 118 for recovering the carbon dioxide-depleted anodic flow 19 is connected to the catalytic burner 126 so that the portion 122 of the carbon dioxide-depleted anodic flow 19 is injected into the catalytic burner 126 in order to be burned therein.

Preferentially, according to such embodiment, the outlet 83 of the fourth heat exchanger system 82 is further connected to the catalytic burner 126 so that a portion 127 of the oxygen-depleted flow 20 is injected into the catalytic burner 126 and burned therein with the portion 122 of the carbon dioxide-depleted anodic flow 19. The other portion 128 of the oxygen-depleted flow 20 is then brought into the installation 26 or discharged into the atmosphere as described above.

Advantageously, according to such embodiment, the installation 22 is connected to the seventh heat exchanger (not shown) located in the furnace 120 so that a portion 129 of the fuel gas flow 14 is heated by the heat generated by the combustion of the portion 122 and the portion 127 inside the burner 120, in order to form a heated fuel gas flow 132. The furnace 120 thus comprises an outlet 130 for recovering the heated fuel gas flow 132.

Preferentially, the outlet 130 of the furnace 120 is connected to the outlet 48 of the first heat exchanger system 42 so that the heated fuel gas flow 132 is injected into the preheated fuel flow 50, in order to form an intermediate fuel flow 133. The intermediate fuel flow 133 is then sent into the desulfurization unit 57 or directly into the second heat exchanger system 44, instead of the preheated fuel flow 50.

According to a preferred embodiment, the installation 10 further comprises a closed heat exchange circuit 134 for recovering the heat generated in one or a plurality of parts of the installation in order to be transferred to another portion of the installation so as to use same.

Preferentially, the closed heat exchange circuit 134 is intended for supplying the heat required for the operation of the carbon dioxide capture unit 34.

Preferentially, the closed circuit 134 is intended for making flow a heat-transfer fluid 136. The heat-transfer fluid may consist of pressurized liquid water, or further of a heat-transfer oil. A heat-transfer fluid system based on the use of water vapor could be further considered.

The operation of the closed heat exchange circuit 134 requires a certain number of additional equipment (not shown, such as one or a plurality of expansion tanks, pumps, valve systems, etc . . . ). Such necessary equipment are well known to a person skilled in the art and will therefore not be described further hereinafter in the description.

According to such embodiment, the carbon dioxide capture unit 34 further includes an inlet 138 for introducing the heat-transfer fluid into the carbon dioxide capture unit 34, and an outlet 140 for recovering the heat-transfer fluid at the outlet of the carbon dioxide capture unit 34.

Still according to such embodiment, the outlet 140 is connected to the sixth heat exchanger system 90 so that the heat-transfer fluid 136 leaving the carbon dioxide capture unit 34 is heated by heat exchange with the intermediate flow 91 (in the absence of a reaction unit 93) or with the carbon monoxide-depleted flow 95 (when the reaction unit 93 is present). The sixth heat exchanger system 90 thus includes an inlet 142 for introducing the heat-transfer fluid 136 from the carbon dioxide capture unit 34, and an outlet 144 for recovering the heat-transfer fluid 136.

The outlet 144 of the sixth heat exchanger 90 is connected to the fifth heat exchanger system 89 so that the heat-transfer fluid 136 leaving the sixth heat exchanger system 90 is heated again by heat exchange with the pre-cooled anodic gas flow 87. The fifth heat exchanger system 89 thus includes an inlet 146 for introducing the heat-transfer fluid 136 from the sixth heat exchanger system 90, and an outlet 148 for recovering the heat-transfer fluid 136.

The outlet 148 of the fifth heat exchanger system 89 is further connected to the fourth heat exchanger system 82 so that the heat-transfer fluid 136 leaving the fifth heat exchanger system 89 is heated again by heat exchange with the cooled cathodic flow 80. The fourth heat exchanger system 82 thus includes an inlet 150 for introducing the heat-transfer fluid 136 from the fifth heat exchanger system 89, and an outlet 152 for recovering the heat-transfer fluid 136.

The outlet 152 of the fourth heat exchanger system 82 is finally connected to the inlet 138 of the carbon dioxide capture unit 34 so that the heat-transfer fluid 136 is cooled by transmitting the heat thereof by heat exchange inside the carbon dioxide capture unit 36.

The carbon dioxide capture unit 34 will now be described with reference to FIG. 2.

As indicated above, the carbon dioxide capture unit 34 includes an inlet 114 for introducing the dry anodic flow 40.

The carbon dioxide capture unit 34 typically comprises an absorber 200 comprising a liquid solvent for extracting the carbon dioxide present in the dry anodic flow 40 so as to form, at the top of the absorber 200, the carbon dioxide-depleted anodic flow 19 and, a bottom flow of carbon dioxide-rich liquid solvent 202.

The carbon dioxide capture unit 34 further comprises a seventh heat exchanger system 204 for heating the flow 202 in order to form a preheated bottom flow 206.

The carbon dioxide capture unit 34 further comprises an eighth heat exchanger system 208 for heating the preheated bottom flow 206 in order to form a heated bottom flow 210.

According to one embodiment, the eighth heat exchanger system 208 includes an inlet 212 for introducing the heat-transfer fluid 136 and an outlet 214 for recovering the heat-transfer fluid so that the preheated flow 206 is heated at the eighth heat exchanger system 208 trough heat exchange with the heat-transfer fluid 136.

The carbon dioxide capture unit 34 further comprises a tank 216 connected to the eighth heat exchanger system 212 and intended for receiving the heated bottom flow 210. The tank 216 is intended for separating the heated bottom flow 210 in order to form, at the top of the tank 216, the carbon dioxide flow 18 and, at the bottom of the tank 216, a carbon dioxide-depleted liquid solvent flow 218 intended for being injected at the top of the absorber 200.

Preferentially, the bottom of the tank 216 is connected to the seventh heat exchanger system 204 so that the carbon dioxide-depleted liquid solvent flow 218 is cooled by heat exchange with the liquid bottom flow 202 in order to form a pre-cooled, dioxide-depleted liquid solvent flow 220. The seventh heat exchanger system 204 thus includes an inlet 222 for introducing the carbon dioxide-depleted liquid solvent flow 218 and an outlet 224 for recovering the pre-cooled, dioxide-depleted liquid solvent flow 220.

Advantageously, the carbon dioxide capture unit 34 further comprises a ninth heat exchanger system 226 for further cooling the pre-cooled, carbon dioxide-depleted liquid solvent flow 220 before being injected at the top of the absorber 200.

The streams described in the installation are merged with the pipes that carry same.

The implementation of a first method according to the invention will now be described.

The method according to the invention comprises first of all supplying at least one fuel gas flow 14, coming from the installation 22 (or from a gas pipe network), and at least one oxygen-rich gas flow 16, coming from the installation 24.

A portion 37 of the fuel gas flow 14 is first mixed with the portion 124 of the carbon dioxide-depleted anodic flow 19 recovered at the outlet 118 of the carbon dioxide capture unit 34 toward the pretreatment unit 28 in order to form the fuel feed flow 35.

The fuel feed flow 35 is introduced into the pretreatment unit 28 in order to be heated and pretreated. To this end, the fuel gas flow 14 is introduced into the first heat exchanger system 42 and heated for a first time. The preheated fuel flow 50, recovered at the outlet 48 of the first heat exchanger system 42, is then introduced into the second heat exchanger system 44 in order to be heated therein again and to form the heated fuel flow 56 at the outlet 54.

Preferentially, the fuel feed flow 35 has a temperature ranging from 0° C. to 50° C., more preferentially from 10° C. to 30° C.

Preferentially, the fuel feed flow 35 is heated in the first heat exchanger 42 to a temperature ranging from 100° C. to 450° C., preferentially ranging from 200° C. to 300° C.

The fuel feed flow 35 can also undergo a preliminary desulfurization step so as to form a desulfurized fuel flow 58. The presence of sulfur in the fuel feed flow 35 is likely to lead to premature wear of the installation, in particular by poisoning the fuel cell unit 30. A desulfurization step may then be necessary to significantly reduce the concentration of sulfur in the fuel feed flow 35, preferentially to completely remove the sulfur present.

The initial fuel feed flow 35 can typically have a concentration of sulfur of 0 to 100 ppm, in particular 0 to 10 ppm. Preferentially, after the desulfurization step, the desulfurized flow 58 then has a concentration of sulfur smaller than or equal to 1 ppm, more preferentially smaller than or equal to 0.1 ppm.

Advantageously, the desulfurization step is carried out by introducing the preheated fuel flow 50 into the desulfurization unit 57. Preferentially, the desulfurized flow 58 recovered at the outlet of the desulfurization unit 57 is then mixed with a flow of water 59 so as to form a mixed flow 60. The mixed flow 60 is then sent to the second heat exchanger system 44 for being heated therein.

Preferentially, the preheated fuel flow 50 (or the mixed flow 60 when the method comprises a desulfurization step) is heated in the second heat exchanger 44 to a temperature ranging from 300° C. to 600° C., preferentially ranging from 400° C. to 500° C.

The heated fuel flow 56 recovered at the outlet of the second heat exchanger system 44 may also undergo, within the pretreatment unit 28, a preliminary prereforming step. When heated to a high temperature, typically greater than 500-600° C., hydrocarbon compounds used as fuels, in particular C2+ hydrocarbon compounds, are likely to fragment by thermal cracking, thus leading to the unwanted formation of deposits in the installation. A preliminary pre-reforming step makes it possible to prevent the thermal cracking phenomenon by converting the heated fuel flow 56 into a flow 62 consisting of hydrogen H2, carbon monoxide CO, carbon dioxide, water and part of the methane present in the unreacted initial fuel gas. Such conversion is performed e.g. in contact with a catalyst such as nickel.

Preferentially, the pre-reforming step is performed by making the heated fuel flow 56 flow through the pre-reforming unit 61. The flow 62 recovered at the outlet of the pre-reforming unit 61 is then sent to the fuel cell unit 30.

The flow 62 recovered at the outlet of the pre-reforming unit 61 typically has a concentration of hydrogen H2 ranging from 20% to 50% by volume, preferentially from 30% to 40% by volume.

The flow 62 recovered at the outlet of the pre-reforming unit typically has a concentration of carbon monoxide CO ranging from 0% to 15% by volume, preferentially from 0% to 10% by volume.

Preferentially, the proportion in the flow 62 of unreacted initial fuel is smaller than 50% by volume, more preferentially smaller than 30% by volume, in particular between 20% and 30% by volume.

Simultaneously, the oxygen-rich gas flow 16 is heated by flowing through the third heat exchanger system 72.

Preferentially, the oxygen-rich gas flow 16 is heated in the third heat exchanger 72 to a temperature ranging from 500° C. to 800° C., preferentially ranging from 600° C. to 700° C.

The hot oxygen-rich gas flow 16 is then introduced into the fuel cell unit 30, at the cathode system 66.

The fuel cell unit 30, fed continuously with the heated fuel flow 56 (or the flow 62 recovered at the outlet of the pre-reforming unit 61) and the oxygen-rich gas flow 16, is then put into operation.

For this purpose, the heated fuel flow 56 (or the flow 62, when a preforming step is performed) is introduced into the fuel cell unit 30, at the inlet 68. In particular, the heated fuel flow 56 (or the flow 62) is injected at the anode system 64.

The heated oxygen-rich gas flow 16 is introduced at the inlet 70 of the fuel cell unit 30. In particular, the hot oxygen-rich gas flow 16 is injected into the cathode system 66.

When entering the fuel cell unit 30, the heated fuel flow 56 (or flow 62) undergoes a first reforming step during which all the initial fuel is converted into a synthesis gas consisting of hydrogen $H_2$ and carbon monoxide CO.

In contact with the anode system 64, the hydrogen $H_2$ dissociates into protons $H^+$ and electrons. The electrons thus released accumulate at the anode system 64 and are transferred to the cathode system 66 of the unit 30 by means of an external circuit, the displacement of the electrons from the anode system 64 to the cathode system 66 generating the electric current 12.

At the cathode system 66, the electrons conveyed are fixed by the oxygen $O_2$ present in the oxygen-rich gas flow 16, resulting in the transformation of the oxygen $O_2$ molecules into oxygen ions $O_2$.

The oxygen ions $O_2$ thus formed then flow through the electrolyte and cross over to the side of the anode system 64 where same react with the previously generated $H^+$ protons so as to form water $H_2O$ and with carbon monoxide CO so as to form carbon dioxide $CO_2$.

The anodic gas flow 36 and the cathodic gas flow 76 are then recovered at the outlet of the fuel cell unit 30.

In particular, the cathodic gas flow 38, corresponding to the residual gas flow recovered at the outlet of the cathode 66, is recovered at the outlet 76 of the unit 30. The flow 38 has a reduced concentration of oxygen relative to the initial oxygen-rich gas flow (16).

Typically, the cathodic gas flow 38 has a concentration of oxygen smaller than or equal to 20% molar, preferentially from 5% molar to 15% molar.

The cathodic gas flow 38 is then conveyed to the installation 26.

According to one embodiment, before reaching the installation 26, the cathodic gas flow 38 is cooled by flowing through a series of heat exchanger systems 72, 82. Preferentially, the cathodic gas flow 38 is first introduced into the third heat exchanger system 72 wherein it is cooled a first time by heat exchange with the oxygen-rich gas flow 16 in order to form the cooled cathodic flow 80.

Such embodiment is advantageous in that same can be used to heat the input oxygen-rich gas flow 16 and to cool the output cathodic gas flow 38 by heat integration, without requiring external energy input.

Preferentially, the cooled cathodic flow 80, recovered at the outlet of the third heat exchanger system 72, is then cooled again by flowing through the fourth heat exchanger system 82 in order to recover at the outlet the gaseous oxygen-depleted flow 20. The oxygen-depleted gas flow 20 is then conveyed to the installation 26.

Preferentially, the cathodic gas flow 38 is cooled in the third heat exchanger system 72 to a temperature ranging from 50° C. to 250° C., preferentially ranging from 100° C. to 200° C.

Preferentially, the cooled cathodic flow 80 is cooled in the fourth heat exchanger system 82 to a temperature ranging from 50° C. to 200° C., preferentially ranging from 100° C. to 150° C.

The anodic gas flow 36 corresponding to the residual gas flow recovered at the outlet of the anode system 64, is recovered at the outlet 74 of the unit 30. The flow 36 consists of a mixture of carbon dioxide $CO_2$, water $H_2O$ resulting from the operation of the fuel cell unit 30 and further of carbon monoxide CO and hydrogen $H_2$ which has not reacted.

Preferentially, at least 30% by volume of the initial synthesis gas is recovered in the anodic gas flow, more preferentially from 30% to 50% by volume.

Preferentially, the anodic gas flow 36 has a concentration of carbon dioxide greater than 10% by volume, more preferentially from 10% to 40% by volume, typically from 20% to 40% by volume.

The anodic gas flow 36, recovered at the outlet of the fuel cell unit 30, typically has a temperature greater than 500° C., preferentially from 750° C. to 850° C.

The entire anodic gas flow 36, recovered at the outlet 74 of the fuel cell unit 30, is then introduced into the post-treatment, cooling and condensation unit 32 in order to be cooled therein and to remove the water formed.

According to an advantageous embodiment, before the introduction thereof into the post-treatment, cooling and condensation unit 32, the anodic gas flow 36 is pre-cooled by flowing through the second heat exchanger system 44, then through the first heat exchanger system 42. In particular, the anodic gas flow 36 is cooled a first time in the second heat exchanger system 44 by heat exchange with the pre-heated fuel flow 50 (or the intermediate fuel flow 133). The intermediate anodic flow 84 thus formed is then cooled again in the first heat exchanger 42 by heat exchange with the initial fuel feed flow 35. A pre-cooled anodic flow 87 is thus obtained at the outlet of the first heat exchanger 42.

Preferentially, the anodic gas flow 36 is cooled in the second heat exchanger system 44 to a temperature ranging from 550° C. to 750° C., preferentially ranging from 650° C. to 750° C.

Preferentially, the intermediate anodic flow 84 is cooled in the fourth heat exchanger 82 to a temperature ranging from 300° C. to 500° C., preferentially ranging from 400° C. to 500° C.

The pre-cooled anodic flow 87 is then introduced into the post-treatment, cooling and condensation unit 32.

Such embodiment is advantageous in that same can be used for heating the fuel feed flow 35, before being introduced into the fuel cell unit 30, and to pre-cool the anodic gas flow 36, by heat integration without requiring external energy input.

The injection of the heated fuel gas flow 132 downstream of the first heat exchanger system 46 can be further used for heating the fuel feed flow 35, before being introduced into the fuel cell unit 30, by heat integration without requiring any external energy input.

At the post-treatment, cooling and condensation unit 32, the anodic gas flow 36 (or the pre-cooled anodic flow 87, in the case of pre-cooling) is cooled by flowing through the fifth heat exchanger system 89 and the sixth heat exchanger system 90. In particular, the anodic gas flow 36 (or the pre-cooled anodic flow 87) is cooled a first time in the fifth heat exchanger system 89. The intermediate flow 91 thus formed is then cooled again in the sixth heat exchanger system 90. A cooled anodic flow 92 is thus obtained at the outlet of the sixth heat exchanger 90.

According to a preferred embodiment, the anodic gas flow 36 (or the pre-cooled anodic flow 87) may also undergo a gas/water conversion step intended for converting a significant fraction of the carbon monoxide CO present in the anodic gas flow 36 (or the pre-cooled anodic flow 87) into carbon dioxide $CO_2$ and hydrogen $H_2$ by reaction with the water vapor present in the flow 36 (or the pre-cooled anodic flow 87). Such step aims to remove a significant fraction of the carbon monoxide CO present in flow 36 (or flow 87) for the treatment thereof in the carbon dioxide capture unit 34.

Preferentially, the gas/water conversion step is performed by introducing the intermediate flow 91 into the gas/water reaction unit 93. The carbon monoxide-depleted flow 95 recovered at the outlet 94 of the gas/water reaction unit 93 is then sent to the sixth heat exchanger system 90 in order to continue the cooling thereof.

The cooled anodic flow 92 is then introduced into a series of condensers 96, 98 in order to condense the water contained in the cooled anodic flow 92. In particular, the cooled gas flow 92 is introduced into the first condenser 96 in order to form the first condensate flow 100 and the intermediate gas flow 102. The intermediate gas flow 102 is then introduced into the second condenser 98 in order to complete the condensation of the water contained in the cooled anodic flow 92 and thus form the second condensate flow 104 and the dry anodic flow 40.

Preferentially, the first flow of condensate 100 is introduced into the tank 106 in order to form, at the bottom of the tank 106, the flow of liquid water 108, and at the top of the tank 106, the gaseous flow of condensate 109. Advantageously, the flow of liquid water 108 is then injected, upstream of the first heat exchanger system 44, into the preheated fuel flow 50 (or into the desulfurized fuel flow 58) in order to be recycled therein and form the mixed flow 60. The water $H_2O$ water is thus used as a reagent in the pre-reforming unit 61.

When the installation 10 is started, the heated fuel flow 56 does not contain any water molecule, and temporary addition of water vapor can be considered for the start-up phase of the method. Once the electrochemical reactions of the fuel cell unit 30 are initiated, since such reactions produce water, the anodic gas flow 36 is enriched with water molecules. The water molecules can thus be recycled by means of the condenser 96 and at the recovery tank 106 into the preheated fuel flow 50 (or into the desulfurized fuel flow 58). The temporary water vapor addition system is no longer necessary. The water concentration can be controlled by calculating a “steam/carbon” ratio which corresponds to the quantity of water present at the inlet of the pre-reforming module 61 divided by the quantity of carbon also present at the inlet of the pre-reforming module 61. Such ratio is typically greater than or equal to 1, preferentially between 1.5 and 3. Good control of the water/carbon ratio makes it possible to prevent any risk of coke deposit formation within the pre-reforming module 61 and the fuel cell unit 30.

According to one embodiment, the method further comprises a step of pressurizing the intermediate gas flow 102, preferentially before same is introduced into the second condenser 98.

Thus, according to such embodiment, the intermediate gas flow 102 is directly introduced into the compression/blower unit 110. A compressed anodic flow 111 is then recovered at the outlet 111 of the compression/blower unit 110.

The compressed anodic flow 111 is then transferred into the second condenser 98.

The compression/blower unit 110 is placed between the two condensers 96 and 98 in order to cool the compressed anodic flow 111 recovered at the outlet 111 of the unit 110 and the temperature of which has increased during the compression/blower step.

Thus, the carbon dioxide capture unit 34 can operate at a minimized temperature allowing same to increase the loading level of the liquid base solvent and thus improve the performance of the unit 34. The compression/blower unit 110 is advantageous in that same can be used for compensating for the head losses accumulated in the equipment during the process, in particular at the absorber 200 of the carbon dioxide capture unit 34.

Other configurations of the compression/blower units 110 could be considered. E.g. a compressor/blower unit additional to the existing unit 110 or replacing same could be installed downstream of the carbon dioxide capture unit 34 in order to increase the pressure of the carbon dioxide-depleted flow 19.

Preferentially, the intermediate gas flow 102 has a pressure ranging from 0.9 bar to 2 bars, more preferentially from 1 bar to 1.1 bars.

At the outlet 111 of the compression unit 110, the compressed anodic flow 112 typically has a pressure ranging from 1.3 bars to 5 bars, preferentially from 1.4 bars to 2 bars.

The dry anodic flow 40 is then introduced into the carbon dioxide capture unit 34 in order to form the stream of carbon dioxide 18 and the carbon dioxide-depleted anodic flow 19.

Figure 2:
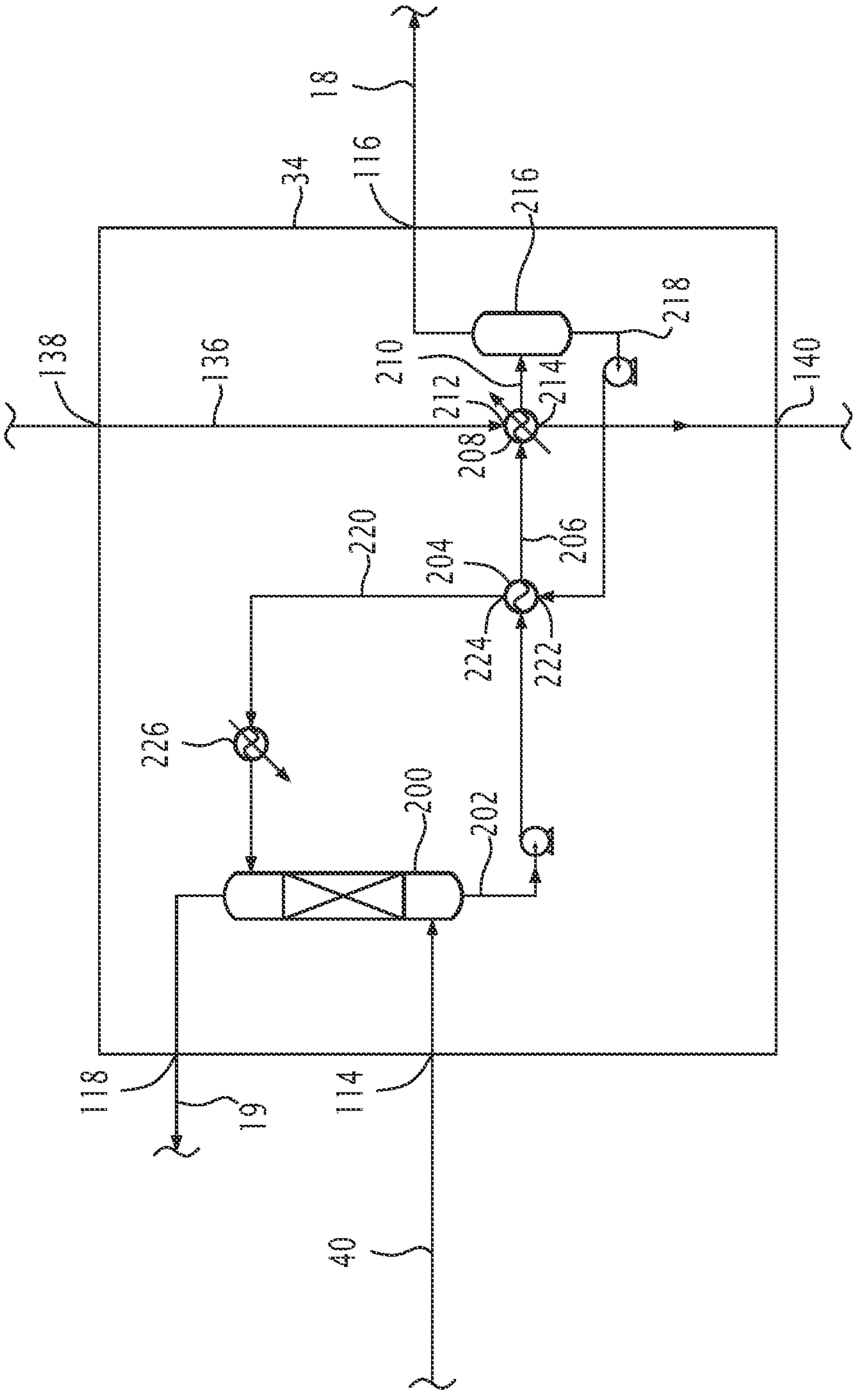
FIG. 2 is an engineering diagram describing the carbon dioxide capture unit of the installation shown in FIG. 1.

For this purpose, with reference to FIG. 2, the dry anodic flow 40 is introduced into the absorber 200 through the introduction inlet 114. Inside the absorber 200, the dry anodic flow 40 is brought into contact with a liquid solvent apt to absorb carbon dioxide.

Different liquid solvents apt to absorb carbon dioxide are known to a person skilled in the art. Aqueous amine solutions, other chemical solvents such as sodium or potassium carbonate, or else other families of physical or ionic solvents can be cited in particular, as an example. Examples of solvents are described in the article Solvents for Carbon Dioxide Capture by Fernando Vega, et al. published on Aug. 16, 2018, in the journal IntechOpen.

Preferentially, the liquid solvent is chosen from amine-containing aqueous solutions apt to adsorb carbon dioxide.

Chemical absorption methods using amine aqueous solutions apt to absorb carbon dioxide are well known to a person skilled in the art and will not be described further herein. Examples of aqueous amine solutions suitable for the invention include solutions composed of one or more of the following compounds: monoethanolamine, diethanolamine, N-methyldiethanolamine, piperazine, 2-amino-2-methylpropan-1-ol, bis(2-hydroxypropyl)amine, 1-methylpiperazine, dimethylaminoethanol.

A certain number of equipment and utility systems necessary for the proper functioning of the absorption units are known to a person skilled in the art and will therefore not be described further hereinafter in the description.

In contact with the dry anodic flow 40, the liquid solvent absorbs the carbon dioxide present in the dry anodic flow 40 in order to form a liquid bottom flow 202 consisting of carbon dioxide-laden liquid solvent, and at the top of the absorber 200, the carbon dioxide-depleted anodic flow 19.

The carbon dioxide-depleted anodic flow 19 typically comprises from 10% to 60% by volume of carbon dioxide $CO_2$, preferentially from 30% to 50% by volume.

The liquid bottom flow 202 consisting of the carbon dioxide-laden liquid solvent is then heated in the seventh heat exchanger system 204 in order to form a preheated bottom flow 206. The preheated bottom flow 206 is then introduced into the eighth heat exchanger system 208 where same is again heated so that the carbon dioxide absorbed by the liquid solvent is partially released in gaseous form. Typically, the preheated bottom flow 206 is heated in the eighth heat exchanger system 208 to a temperature greater than 70° C., preferentially greater than 80° C., in particular close to 90° C. The heated bottom flow 210 recovered at the outlet of the eighth heat exchanger system 208, is introduced into the tank 216 in order to form, at the top of the tank 216, the stream of carbon dioxide 18, and at the foot of the tank 216, a stream of carbon dioxide-depleted liquid solvent 218.

The stream of carbon dioxide-depleted liquid solvent 218 is then reinjected into the absorber 200 for being recycled therein.

The stream of carbon dioxide-depleted liquid solvent 218 taken from the bottom of the tank 216 then comprises the initial liquid solvent along with a portion of the absorbed carbon dioxide which has not been released by expansion into the tank 216 following heating in the seventh 204 and eighth 212 heat exchanger systems.

Typically, at least 15% of the liquid solvent is still carbon dioxide-laden, preferentially at least 35%, more preferentially from 55 to 65%.

In other words, the stream of carbon dioxide-depleted liquid solvent 218 has a concentration of carbon dioxide less than or equal to 0.1 mol of $CO_2$ per mole of dry base amine solvent, preferentially from 0.15 to 0.4 mol of $CO_2$ per mole of amine solvent in dry base, even more preferentially from 0.30 to 0.35 mol of $CO_2$ per mole of amine solvent in dry base.

Preferentially, before being re-injected into the absorber 200, the stream of carbon dioxide-depleted liquid solvent 218 is cooled in the seventh heat exchanger system 204 by heat exchange with the liquid bottom flow 220 coming from the absorber 200.

The stream of carbon dioxide-depleted liquid solvent 218 may also undergo an additional cooling step before same is injected into the absorber 200, e.g. by flowing through the ninth heat exchanger system 226, using an external cooling source.

According to one embodiment, the preheated bottom flow 206 is heated at the eighth heat exchanger system 208 by heat exchange with the closed heat exchange circuit 134.

Preferentially, the preheated bottom flow 206 is heated by heat exchange with the heat-transfer fluid 136 flowing through the closed circuit 134.

Preferentially, the heat-transfer fluid 136 is heated by heat exchange with the intermediate flow 91 (or the carbon monoxide-depleted flow 95), and/or with the pre-cooled anodic gas flow 87 and/or with the cooled cathodic flow 80.

A portion 124 of the carbon dioxide-depleted anodic flow 19 recovered at the outlet of the carbon dioxide capture unit 34 is then mixed with the first portion 37 of the fuel gas flow 14 in order to form the fuel feed flow 35.

The portion 124 of the carbon dioxide-depleted anodic flow 19 is thus recycled during the process.

Preferentially, the portion 124 of the carbon dioxide-depleted anodic flow 19 represents at least 30% by volume of the fuel feed flow 35, more preferentially from 50% to 85% by volume, even more preferentially from 70% to 80% by volume.

Preferentially, the first portion 37 of the fuel gas flow 14 represents at least 70% by volume of the fuel feed flow 35, more preferentially from 15% to 50% by volume, even more preferentially from 20% to 30% by volume.

The remainder of the carbon dioxide-depleted anodic flow 19 (the portion 122) is further injected into the furnace 120 in order to be burned therein. The combustion of the portion 122 then makes it possible to prevent the accumulation of inert gases in the installation 10.

Preferentially, at least 1% by weight of the carbon dioxide-depleted anodic flow 19 is injected into the burner, more preferentially from 5% by weight/volume to 20% by weight.

The percentage of carbon dioxide-depleted flow 19 to be burned depends directly on the concentration of inert gases accumulated in the carbon dioxide-depleted flow 19. A person skilled in the art would know how to determine a suitable percentage.

According to a certain embodiment, a portion of the fuel gas flow 14 can be further injected into the furnace 120, in particular into the catalytic burner 126, in order to be burned with the portion 122. Such embodiment can e.g. be implemented during the start-up phases of the installation 10 in order to provide a proper operation of the installation 10.

The quantity of the fuel gas flow 14 injected into the furnace 120 is then adjusted in order to limit the overall emissions of carbon dioxide from the installation 10. Preferentially, despite such emissions, at least 80% molar of the carbon dioxide produced during the process according to the invention is captured, preferentially at least 90% molar, more preferentially from 90 to 99% molar.

Advantageously, a portion 127 of the oxygen-depleted flow 20 is also injected into the furnace 120, in particular into the catalytic burner 126, in order to be burned therein with the portion 122 of the carbon dioxide-depleted anodic flow 19. The other portion 128 of the oxygen-depleted flow 20 is then conveyed to the installation 26.

Preferentially, at least 1% by weight of the oxygen-depleted flow 20 is injected into the furnace 120, more preferentially from 5% by weight/volume to 20% by weight.

Preferentially, at least a portion 129 of the initial fuel gas flow 14 is made to flow inside the furnace 120, in particular in the seventh heat exchanger system (not shown) of the furnace 120, in order to be heated by the heat generated by the combustion of the portion 122 and of the portion 127. The heated fuel gas flow 132, recovered at the outlet 130 of the furnace 120, in particular of the seventh heat exchanger system, is then injected into the preheated fuel flow 50 in order to form the intermediate fuel flow 133.

Preferentially, at least 5% by volume of the fuel gas flow 14 is heated at the furnace 120, more preferentially from 10% by volume to 40% by weight.

Preferentially, the portion 124 of the carbon dioxide-depleted anodic flow 19 represents at least 20% by volume of the intermediate fuel flow 133, more preferentially from 30% to 60% by volume, even more preferentially from 40% to 50% by volume.

Preferentially, the first portion 37 of the fuel gas flow 14 represents at least 5% by volume of the intermediate fuel flow 133, more preferentially from 10% to 35% by volume, even more preferentially from 15% to 25% by volume.

The installation and the method according to the invention can thus be used for producing an electric current 12 by means of a fuel cell unit 30 while allowing the carbon dioxide $CO_2$ formed to be recovered.

The invention is based on the observation that an increase in the concentration of carbon dioxide in the fuel feed flow 35 either does not affect or affects very little the operation of the fuel cell unit 30. Carbon dioxide is indeed a neutral gas for the fuel cell unit 30 since it does not participate in any reaction likely to occur inside the fuel cell unit 30. Carbon dioxide can thus have a significant concentration and be recycled in the installation 10 without significantly affecting the performance of the fuel cell unit 30. Since the fuel cell unit 30 requires the presence of fuel, it is clear that such increase in the carbon dioxide concentration is limited so that a sufficient quantity of fuel gas is injected into fuel cell unit 30.

In particular, the installation and the method according to the invention make it possible to significantly reduce the energy requirement associated with the recovery of carbon dioxide by proposing to recycle a significant portion of the carbon dioxide formed during the process directly into the fuel feed flow 35. In particular, the recycling of carbon dioxide leads to an increase in the concentration of carbon dioxide throughout the installation 10, and in particular in the anodic gas flow 36 recovered at the outlet of the fuel cell unit 30. Such increase in the concentration of carbon dioxide in the effluents to be treated then makes it possible to significantly reduce the energy necessary for the recovery of carbon dioxide.

Indeed, the increase in the concentration of carbon dioxide in the effluents to be treated makes it possible to overcome the need to intensively regenerate the liquid solvent used in the capture unit 34: a partial regeneration of the liquid solvent, typically from 40 to 50% by weight of the liquid solvent, is sufficient. The energy required for the regeneration of the liquid solvent is thus significantly reduced. Thus, the regeneration of the liquid solvent is carried out by heating to significantly lower temperatures, typically below 100° C. In conventional units for capturing carbon dioxide from fumes, the liquid solvent is vaporized in a reboiling unit located at the bottom of the regeneration unit and rises within the stripping column. The invention makes it possible here to release the carbon dioxide and to (partially) regenerate the liquid solvent without the energy-consuming vaporization step, while bringing same to a level of regeneration sufficient for the necessary partial absorption to take place in the absorber 200. The energy requirements and the operating temperatures of the carbon dioxide capture unit 34 are thus significantly reduced. In addition, the use of a stripping column or of reboilers and condensers conventionally used in capture units is no longer necessary: a simple flash tank is sufficient for achieving a sufficient level of regeneration.

The energy requirement of the capture unit 34 is so much reduced that the thermal energy required for the operation of the capture unit can be recovered by heat integration. As explained above, the heat required for the regeneration of the liquid solvent can be provided by heat integration by means of a closed circuit 34 which recovers the heat emitted at different places of the installation 10. In particular, the partial regeneration of the liquid solvent can be carried out by heat recovery at the heat exchanger systems involved in the post-treatment of the effluents of the fuel cell unit 34, in particular at the fourth 82, fifth 89 and sixth 90 heat exchange systems.

No external thermal system is then necessary for the proper operation of the carbon dioxide capture unit.

Moreover, the heat emitted during the operation of the fuel cell unit 30 can be used to preheat the flows 56, 72 which feed the fuel cell unit 30. A portion of the heat energy dispersed by the fuel cell unit 30 is thus recovered, thereby increasing the overall efficiency of the system.

The method and the installation according to the invention are further advantageous in that the heat recovered at the outlet of the fuel cell unit 30 can be used for regenerating the liquid solvent at the expansion tank 216 at low thermal level. Such expansion takes place at a pressure relatively close to atmospheric pressure, typically from 1 atmosphere to 2 atmospheres. Whenever all of the heat energy available at the outlet of the anode system 64 is not used, it is possible to recover the heat energy so as to increase the temperature of the heat-transfer fluid 136 and thus regenerate the liquid solvent at a higher pressure. The increase in the operating pressure of the expansion tank 216 can then be used to considerably reduce the number of compression levels needed for the transport and/or liquefaction of carbon dioxide $CO_2$. The method and the installation according to the invention lead therefore, to saving equipment and energy consumption in the overall chain (electricity production, capture, export).

In conventional post-combustion installations for fuel cell effluents, fumes treated with aqueous amine solutions and recovered at the outlet of the carbon dioxide capture unit are intended for being discharged into the atmosphere. Such fumes may, however, contain toxic and polluting constituents resulting e.g. from the degradation of solvents. A good practice which prevents air pollution is to wash the fumes with water before discharging same into the atmosphere (the water must then be depolluted). Additional equipment is then necessary, associated with energy costs for setting the equipment into operation. Within the framework of the invention, the carbon dioxide-depleted anodic flow 19 is recycled toward the fuel cell unit 30 wherein the pollutants are captured (desulfurization unit 57), or burned directly in the fuel cell unit 30. Hence there is no discharge of such pollutants into the atmosphere. The installation and the method according to the invention make it possible in particular not to need additional depollution equipment.

The method and the installation according to the invention are also advantageous in that same can be used to recover at least 90% of the carbon dioxide formed.

Finally, the installation and the method according to the invention are also advantageous in that they lead to an efficient recycling of the fuel which has not been consumed in the fuel cell unit.

The invention claimed is:

1. A method of operating a fuel cell system comprising:

operating a fuel cell unit comprising at least one anode system and at least one cathode system, the fuel cell unit being continuously fed with a fuel feed flow injected into the anode system and with an oxygen-rich gas flow injected into the cathode system;

recovering, at an outlet of the fuel cell unit, a carbon dioxide-rich anodic gas flow and a cathodic gas flow comprising water;

cooling the anodic gas flow to condense the water present in the anodic gas flow in a post-treatment, cooling and condensation unit in order to form a dry anodic flow;

introducing the dry anodic flow into a carbon dioxide capture unit in order to form a carbon dioxide gas flow and a carbon dioxide-depleted anodic flow, wherein the carbon dioxide-depleted anodic flow has a concentration of carbon dioxide of from 20% to 70% by volume; and injecting at least a portion of the carbon dioxide-depleted anodic flow into the fuel feed flow so as to recycle said at least a portion into the fuel cell unit.

2. The method according to claim 1 wherein the carbon dioxide-depleted anodic flow has a concentration of carbon dioxide between 40% and 60% by volume.

3. The method according to claim 1, wherein at the carbon dioxide capture unit, the dry anodic flow is brought into contact with a liquid solvent apt to absorb carbon dioxide in order to form the carbon dioxide-depleted anodic flow and a liquid bottom flow comprising the carbon dioxide-laden liquid solvent.

4. The method according to claim 3, wherein the carbon dioxide absorbed in the liquid bottom flow is then partially released by heating the liquid bottom flow in order to form the carbon dioxide flow and a partially regenerated liquid solvent flow.

5. The method according to claim 4, wherein the liquid bottom flow is heated by heat exchange with the anodic gas flow and/or the cathodic gas flow.

6. The method according to claim 4, wherein the liquid bottom flow is at least partially heated by heat exchange with a heat-transfer fluid flowing through a closed heat exchange circuit, the heat-transfer fluid being heated by heat exchange with the anodic gas flow and/or the cathodic gas flow.

7. The method according to claim 1, wherein at least 80% of the carbon dioxide produced during the execution of the method is recovered in the carbon dioxide gas flow.

8. The method according to claim 1, wherein the feed flow of fuel is a C1-C5 hydrocarbons flow.

9. The method according to claim 1, wherein a portion of the carbon dioxide-depleted anodic flow is taken from the carbon dioxide capture unit and then burned in a furnace.

10. The method according to claim 1, wherein, prior to being injected into the fuel cell unit, the fuel feed flow is heated by heat exchange with the anodic gas flow.

11. A fuel cell installation comprising:

a fuel cell unit including an inlet for introducing a fuel feed flow, an inlet for introducing an oxygen-rich gas flow, an outlet for recovering an anodic gas flow, and an outlet for recovering a cathodic gas flow;

a post-treatment cooling and condensation unit for cooling and drying the anodic gas flow in order to form a dry anodic flow;

a carbon dioxide capture unit configured to form a carbon dioxide gas flow and a carbon dioxide-depleted anodic flow, the carbon dioxide capture unit comprising an inlet for introducing the dry anodic flow and an outlet for recovering the carbon dioxide-depleted anodic flow, wherein the carbon dioxide-depleted anodic flow has a concentration of carbon dioxide of from 20% to 70% by volume, wherein the outlet for recovering the carbon dioxide-depleted anodic flow is connected to the inlet for introducing the fuel feed flow into the fuel cell unit.

12. The installation according to claim 11, wherein the carbon dioxide capture unit comprises:

an absorber configured to bring the dry anodic flow into contact with a liquid solvent apt to absorb carbon dioxide to form the carbon dioxide-depleted anodic flow at the top of the absorber and, at the bottom of the absorber, a liquid bottom flow comprising the carbon dioxide-laden liquid solvent;

at least one heat exchanger system configured to heat the liquid bottom flow in order to form a heated bottom flow;

a tank connected to the at least one heat exchanger system configured to form at the top of the tank the stream of carbon dioxide and, at the foot of the tank, a stream of partially regenerated liquid solvent intended for being injected into the absorber.

13. The installation according to claim 12, further comprising a closed heat exchange circuit comprising a heat-transfer fluid intended for being placed under heat exchange with a liquid bottom flow comprising the carbon dioxide-laden liquid solvent, at said at least one heat exchanger system, along with the anodic gas flow and/or the cathodic gas flow.

14. The installation according to claim 11, wherein the carbon dioxide capture unit does not have a stripping column.

15. A fuel cell installation comprising:

a fuel cell unit including an inlet for introducing a fuel feed flow, an inlet for introducing an oxygen-rich gas flow, an outlet for recovering an anodic gas flow, and an outlet for recovering a cathodic gas flow;

a post-treatment cooling and condensation unit for cooling and drying the anodic gas flow in order to form a dry anodic flow; and a carbon dioxide capture unit configured to form a carbon dioxide gas flow and a carbon dioxide-depleted anodic flow, the carbon dioxide capture unit comprising:

an inlet configured to receive the dry anodic flow from the post-treatment cooling and condensation unit;

an absorber configured to bring the dry anodic flow into contact with a liquid solvent to absorb carbon dioxide to form, at a top of the absorber, the carbon dioxide-depleted anodic flow and, at the bottom of the absorber, a liquid bottom flow comprising the carbon dioxide-laden liquid solvent;

at least one heat exchanger system configured to heat the liquid bottom flow with a stream of partially regenerated liquid solvent in order to form a heated bottom flow;

a tank fluidically connected to the at least one heat exchanger system to receive the heated bottom flow and, at the top of the tank, the stream of carbon dioxide and, at the foot of the tank, the stream of partially regenerated liquid solvent; and and an outlet for recovering the carbon dioxide-depleted anodic flow, wherein the outlet for recovering the carbon dioxide-depleted anodic flow is connected to the inlet for introducing the fuel feed flow into the fuel cell unit.

16. The installation according to claim 15, wherein the carbon dioxide capture unit further comprises a closed heat exchange circuit having a heat-transfer fluid configured to exchange heat with the liquid bottom flow comprising the carbon dioxide-laden liquid solvent exiting the at least one heat exchanger system.

17. The installation according to claim 16, wherein the closed heat exchange circuit is further configured to cause heat exchange between the heat-transfer fluid and the anodic gas flow, and the cooled cathodic flow.

18. The installation according to claim 15, wherein the tank is fluidically connected to the at least one heat exchanger system, downstream of the at least one heat exchanger system.

19. The installation according to claim 18, wherein the carbon dioxide capture unit further comprises a closed heat exchange circuit having a heat-transfer fluid and a heat exchange unit fluidically connected downstream of the at least one heat exchanger system and upstream of the tank, wherein the closed heat exchange circuit is configured to exchange heat between the heat-transfer fluid and the liquid bottom flow comprising the carbon dioxide-laden liquid solvent exiting the at least one heat exchanger system.

20. The installation according to claim 15, wherein at least one heat exchange system is a first heat exchange system, and wherein the carbon dioxide capture unit further comprises a second heat exchange system fluidically connected downstream of the tank and the first heat exchange system and upstream of an inlet of the absorber, the second heat exchange system configured to cool and generate a stream of regenerated liquid solvent.

* * * * *